United States Patent [19]

Becnel

[11] 4,236,427
[45] Dec. 2, 1980

[54] TOGGLE LATCH OPENING AND CLOSING TOOL

[75] Inventor: Larry H. Becnel, West Covina, Calif.

[73] Assignee: General Dynamics Corporation Pomona Division, Pomona, Calif.

[21] Appl. No.: 21,520

[22] Filed: Mar. 19, 1979

[51] Int. Cl.$^3$ .............................................. B25B 27/00
[52] U.S. Cl. ....................................... 81/3 R; 254/131
[58] Field of Search ................. 81/1 R, 3 R; 254/131, 254/132

[56] References Cited

U.S. PATENT DOCUMENTS

| | | | |
|---|---|---|---|
| 605,730 | 6/1898 | Leyendecker . | |
| 1,269,461 | 6/1918 | Krewson . | |
| 1,917,320 | 7/1933 | North | 81/3 R UX |
| 2,576,000 | 11/1951 | Cowan, Jr. . | |
| 2,688,266 | 9/1954 | Knudsen et al. . | |
| 3,152,391 | 10/1964 | Bjorn et al. | 254/131 X |
| 3,580,544 | 5/1971 | Payne . | |
| 3,835,489 | 9/1974 | Lagace et al. | 254/131 X |

Primary Examiner—James G. Smith
Attorney, Agent, or Firm—Henry M. Bissell; Edward B. Johnson

[57] ABSTRACT

The improved tool of the present invention is adapted to open and close efficiently and rapidly at least two types of widely used container toggle latches, one type having a latch handle in the form of a flat tongue and the other type having a hollow, generally tubular, open-ended latch handle. The improved tool comprises a generally L-shaped shank formed of first and second diverging legs integrally joined together at one end, and a handle secured to the free rear end of the first leg. The second leg, which is generally vertical in usual use, depends from the generally horizontal front end of the first leg; and the free end of the second leg is configured into a spaced, generally vertical pair of tines of unequal length. The shorter tine is closer to the handle. The handle may be large to readily fit the hand. The legs are generally flat and vertically oriented, with the first leg longer than the second leg for improved leverage when operating the tool. The upper end of the space defined between the tines may be rectangular for better gripping of the latch tongue, and the upper margin of the juncture between the legs may be sloped to facilitate prying with the tool. The tool is inexpensive, durable, safe and highly efficient.

6 Claims, 14 Drawing Figures

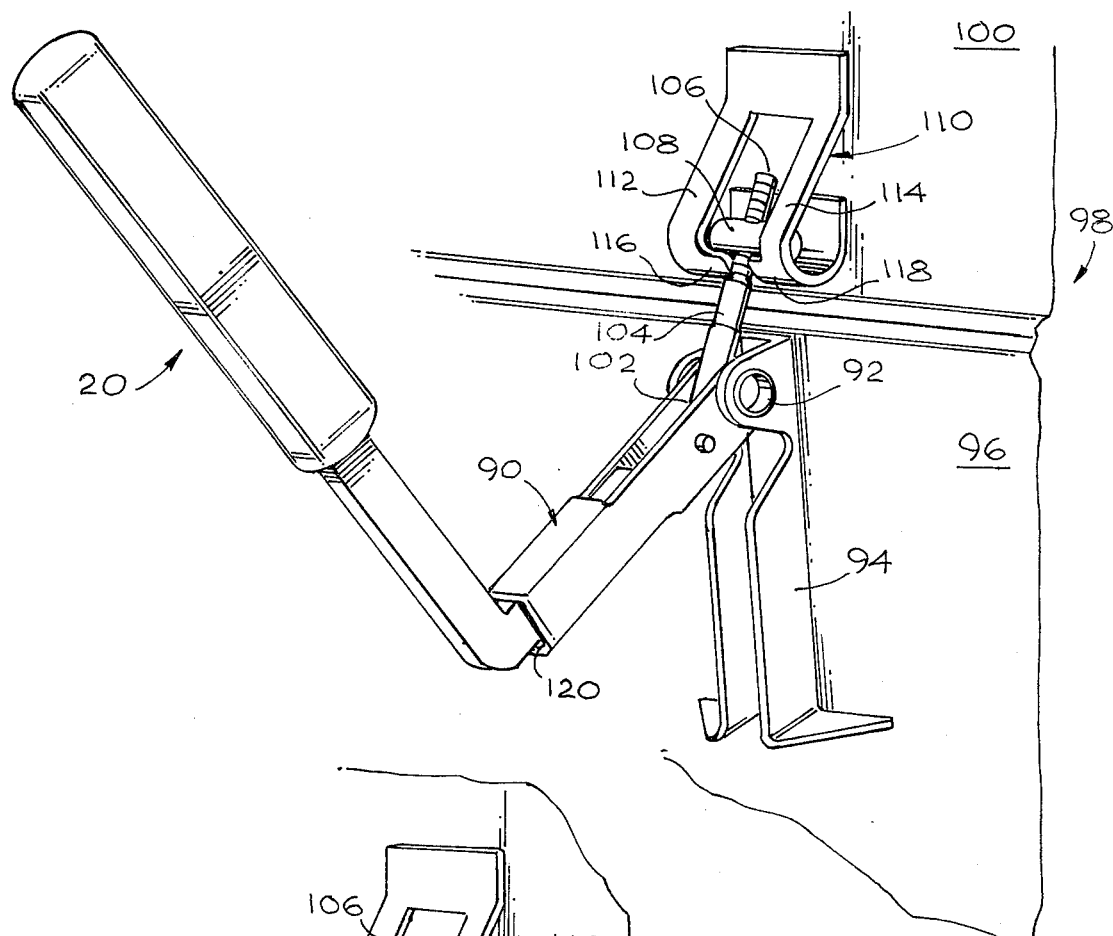
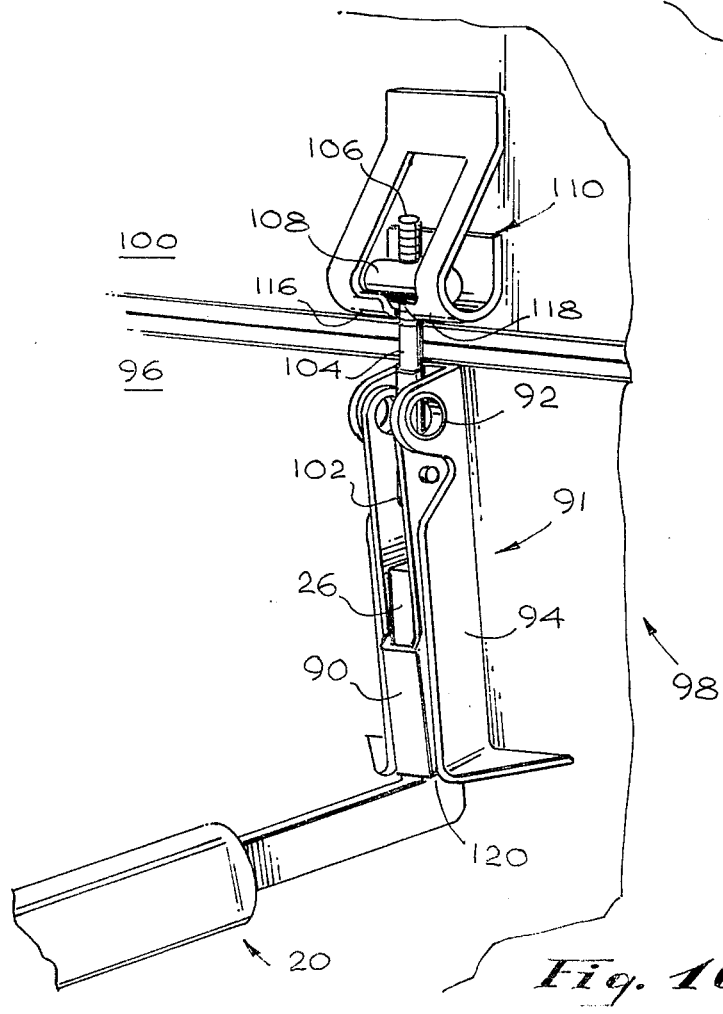
Fig. 11
Fig. 10

TOGGLE LATCH OPENING AND CLOSING TOOL

BACKGROUND OF THE INVENTION

1. Field of the Invention

The present invention generally relates to latch openers and more particularly to improved toggle latch opening and closing tools.

2. Description of the Prior Art

Many tools have been devised for many different purposes. Some of these are in common usage and may be suitable for performing a variety of functions. A carpenter's crow bar is useful for prying, removing nails, etc., as disclosed in the Alger U.S. Pat. No. 3,813,081. Bottle and can openers are well-known although the bottle opener of the Cowan, Jr. U.S. Pat. No. 2,576,000 uses a special configuration for performing its function in a particular manner. Special prying tools of different types are more specialized and esoteric in their configuration and function, and are less well-known or widely used. Examples may be found in the archer's tool of the Allen U.S. Pat. No. 3,873,068, the pry bar with interchangeable heads of the Morrow U.S. Pat. No. 3,587,121, the specialized tool for use with disc brakes of the Payne U.S. Pat. No. 3,580,544, the camber and caster adjustment of the Castoe U.S. Pat. No. 3,915,431, the prying tools of the Leyendecker U.S. Pat. No. 605,730 and Krewson U.S. Pat. No. 1,269,461, the specialized hinge adjustment tool of the Goodwin et al U.S. Pat. No. 3,965,720 and the clamp actuating lever of Knudsen et al U.S. Pat. No. 2,688,266, to name a few. While the latching tool of the present invention is a tool of a special purpose type, it also has particular versatility in that it can be used both for opening and closing a latch and may be used with latches of different types.

Certain types of containers, such as containers for certain military equipment and the like, usually have closure means in the form of toggle latches which can be very difficult to open by hand. One common type of toggle latch employs a latch handle in the form of a large flat thin tongue. A second common type of toggle latch employs a latch handle which is hollow and open at one end. Usually, resort must be made to one or more pairs of pliers, screw drivers, crow bars or the like in order to open such latches, and damage to the latch may occur as a result. Frequently the tool which has been used to open a given type of latch is not well adapted to close the latch again. Moreover, when a different type of toggle latch is encountered, other tools must be found to open and close the latch.

It would therefore be desirable to provide a toggle latch tool which could be equally well employed for safely opening and also closing a toggle latch. Preferably, such a tool could be used successfully with two or more common types of toggle latches such as those described above. Such a tool should be relatively inexpensive, compact, durable, safe and easy to make and to use.

SUMMARY OF THE INVENTION

The foregoing needs have now been satisfied by the improved toggle latch opening and closing tool of the present invention. The tool is substantially as set forth in the Abstract above. The tool can be inexpensively made of durable materials and is relatively compact. It is usable with equal facility on two types of toggle latches. Thus, it can be inverted and one end thereof easily inserted within the hollow handle portion of one type of toggle latch and the tool can be pivoted to open and close that latch. The tool can also be used in the uninverted or upright position to open a second type of toggle latch, that is, the type which employs a latch handle in the form of a board, thin, flat tongue. Thus, the bifurcated end of the tool can be used to grip the top of the latch handle while the tool is pivoted to force the latch tongue away from the container to which the latch is secured. Each operation of the tool is natural, safe, rapid and simple with adequate leverage available to open and close even very large and heavy latches and without damage to the latch or container, by virtue of the construction of the tool.

BRIEF DESCRIPTION OF THE DRAWING

A better understanding of the present invention may be had from a consideration of the following detailed description, taken in conjunction with the accompanying drawing in which:

FIG. 10 is a schematic perspective view of the tool of FIG. 1 releasably engaging a fully closed hollow type latch handle; and FIGS. 11 through 14 are sequential schematic perspective views of the tool of FIG. 1 in operation on the latch of FIG. 10 during opening of that latch, FIGS. 11 through 13 showing intermediate stages between the fully closed position of FIG. 10 and the fully open resting position of FIG. 14.

DESCRIPTION OF THE PREFERRED EMBODIMENT

FIGS. 1-3

Figure 1:
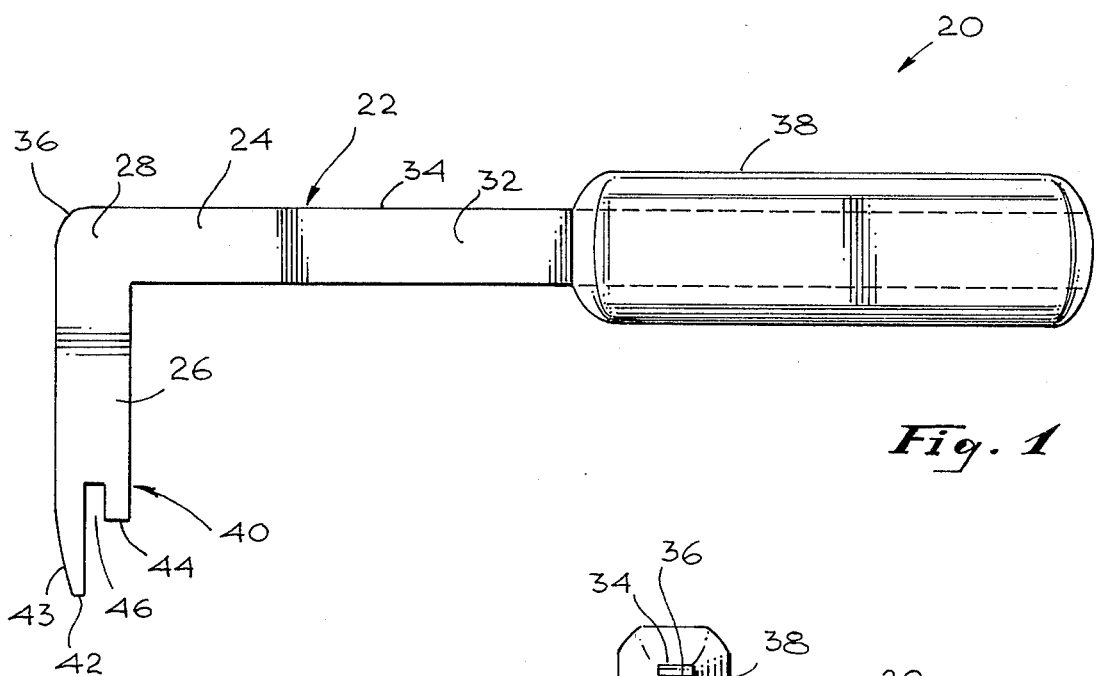
FIG. 1 is a schematic side elevation of a preferred embodiment of the improved toggle latch opening and closing tool of the present invention.
Figure 2:
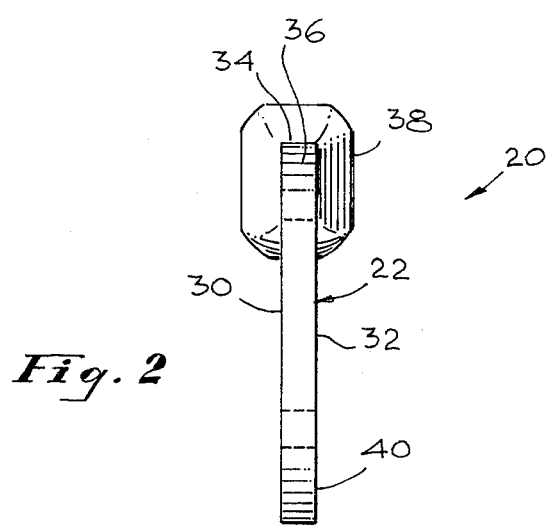
FIG. 2 is a schematic front elevation of the tool of FIG. 1.
Figure 3:
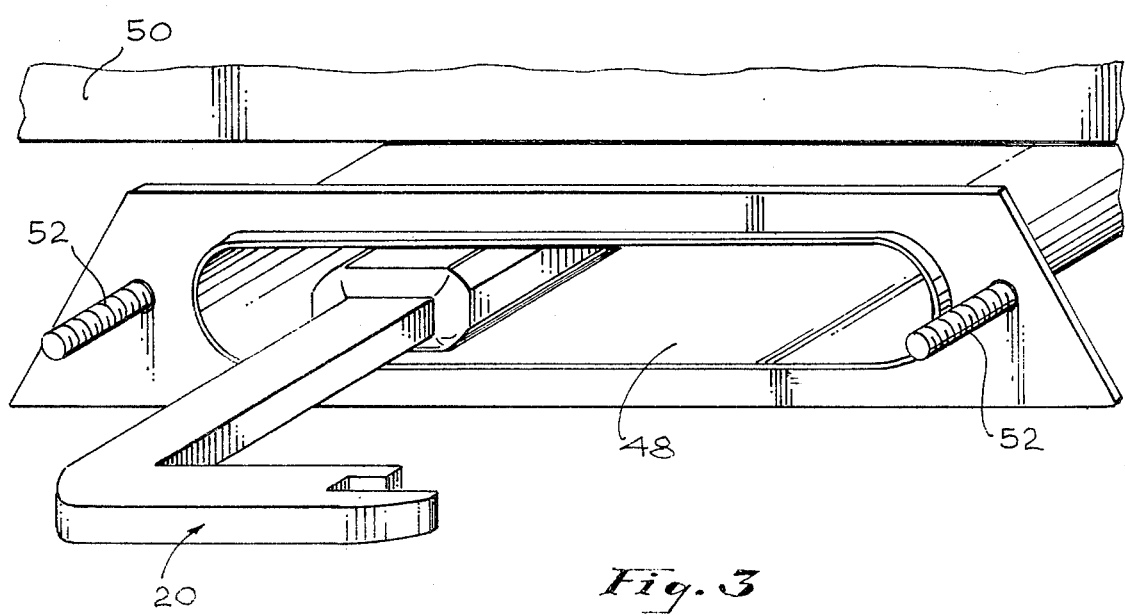
FIG. 3 is a schematic perspective view of the tool of FIG. 1 shown disposed in a storage compartment affixed to a container.

A preferred embodiment of the improved toggle latch opening and closing tool of the present invention is schematically depicted in FIGS. 1-3. Thus, a tool 20 is shown which comprises and L-shaped flank 22 formed of diverging integral first leg 24 and second leg 26 joined to each other at a common junction 28. In FIG. 1 as shown, leg 24 extends horizontally while leg 26 depends vertically from the front end 28 thereof. Legs 24 and 26 are relatively thin and flat and blade-like with vertical sides 30 and 32 (FIG. 2). Shank 22 preferably is metal such as steel. However, it can be formed of reinforced plastic or other materials if sufficiently strong. The upper margin 34 of shank 22 is preferably curved with a full radius through 90°, as shown in FIG. 1 at shoulder 36 in the area of junction 28, to facilitate use of tool 20 against the surface of a container bearing a toggle latch to be opened, as more particularly described hereinafter.

Preferably, leg 24 is longer than leg 26, but the rear portion of leg 24 is covered by a hand-fitting handle 38 of relatively larger diameter than leg 24, as shown in FIG. 1. Handle 38 can be of plastic, wood, metal, etc. Typical dimensions for tool 20 are a handle 38 of about 4 inches in length, leg 24 of overall length of about 7 inches, about 4¼ inches of which are covered by handle 38, and a length of about 2.5 inches for leg 26 extending below leg 24. Legs 24 and 26 may each have blade dimensions of about ½ inch width and about ¼ inch in thickness.

The lower free end 40 of leg 26 is configured to define a spaced pair of parallel tines 42 and 44. Tine 42 is disposed in front of tine 44, as shown in FIG. 1. Tine 42 may be, for example, about ¾ inch in length, while tine 44 may be, for example, about ¼ inch in length. Tines 42 and 44 may be separated from each other by, for example, a space 46 of about ¼ inch or 3/16 inch which is generally rectangular in outline. Also, for use with the type of latch shown in FIGS. 4–9, the outer edge 43 of tine 42 is bevelled so that the tine 42 is tapered toward its tip. This enables the tine 42 to slip readily into place behind the latch handle, between the latch handle and a protruding bead or lip extending along the edge of the associated container. This configuration facilitates proper alignment and engagement of tool 20 with the edge of a tongue type of toggle latch handle, as more particularly illustrated in FIGS. 4–9. It will be understood that the dimensions of leg 26 are also selected so that leg 26 can be easily slid into a conventional hollow type latch handle in order to maneuver that type of latch between the closed and open positions, as shown in FIGS. 10–14.

Tool 20 can be made sufficiently small, light in weight and compact so that it can be conveniently stored in a compartment 48 such as is shown schematically in FIG. 3. Compartment 48 can be affixed to a container 50 bearing a toggle latch (not shown) to be opened by tool 20. Compartment 48 can be provided with a lid (not shown) releasably securable thereto, as by threaded bolts 52 and nuts (not shown).

FIGS. 4–9

Now referring more particularly to FIGS. 4–9, tool 20 is schematically shown therein in operation, that is, opening a tongue type of toggle latch. Thus, a container 54 is shown which comprises a lid 56 and base 58. Lid 56 is releasably secured to base 58 by a toggle latch 60. Latch 60 is also shown as an over-the-center type of latch and includes a bracket 62 secured to base 58 and a claw 64 (see particularly FIG. 8) adapted to releasably engage the raised or beaded lower rim 66 of lid 56. Claw 64 is secured to a fixture 68 by a threaded bolt 70 so that the position of the hooked lid gripping portion 72 of claw 64 can be easily adjusted by rotation of claw 64 around bolt 70. Tongue-type handle 74 is pivotably secured to bracket 62. Fixture 68 is also pivotably secured to bracket 62, but through handle 74 and a core linkage 76 so that as handle 74 is rotated from its upwardly extending closed position (FIG. 5) out into an approximately horizontal position (FIGS. 7 and 8), fixture 68 is caused to rise, carrying claw 64 with it so that hook 72 disengages rim 66. As tongue 74 is rotated down from the horizontal position into an inverted fully open position (FIG. 9), it causes fixture 68 to swing claw 64 away from lid 56 and follow tongue 74 (FIG. 9), so that lid 56 is clear of latch 60 and can be raised.

Figure 4:
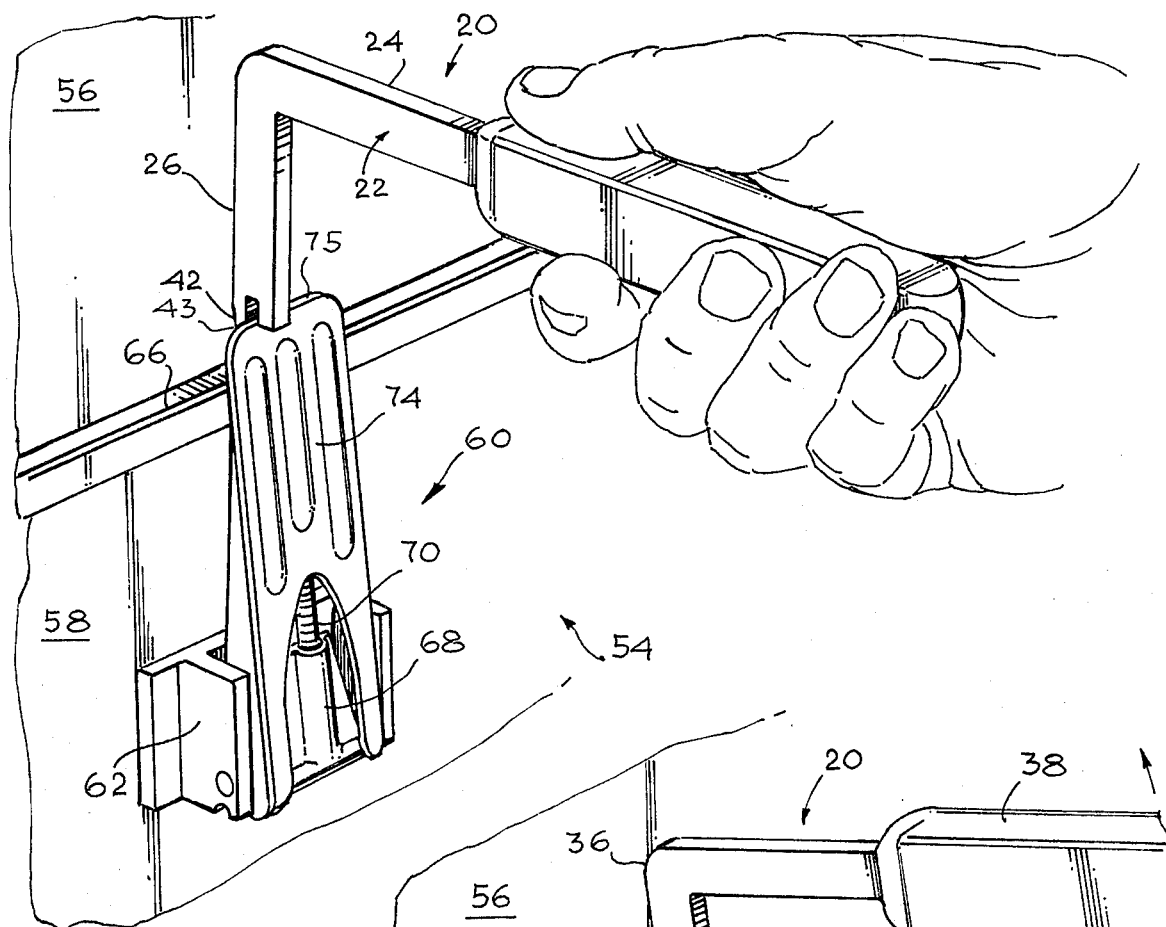
FIG. 4 is a schematic perspective view of the tool of FIG. 1 releasably engaging a fully closed tongue type latch handle.
Figure 5:
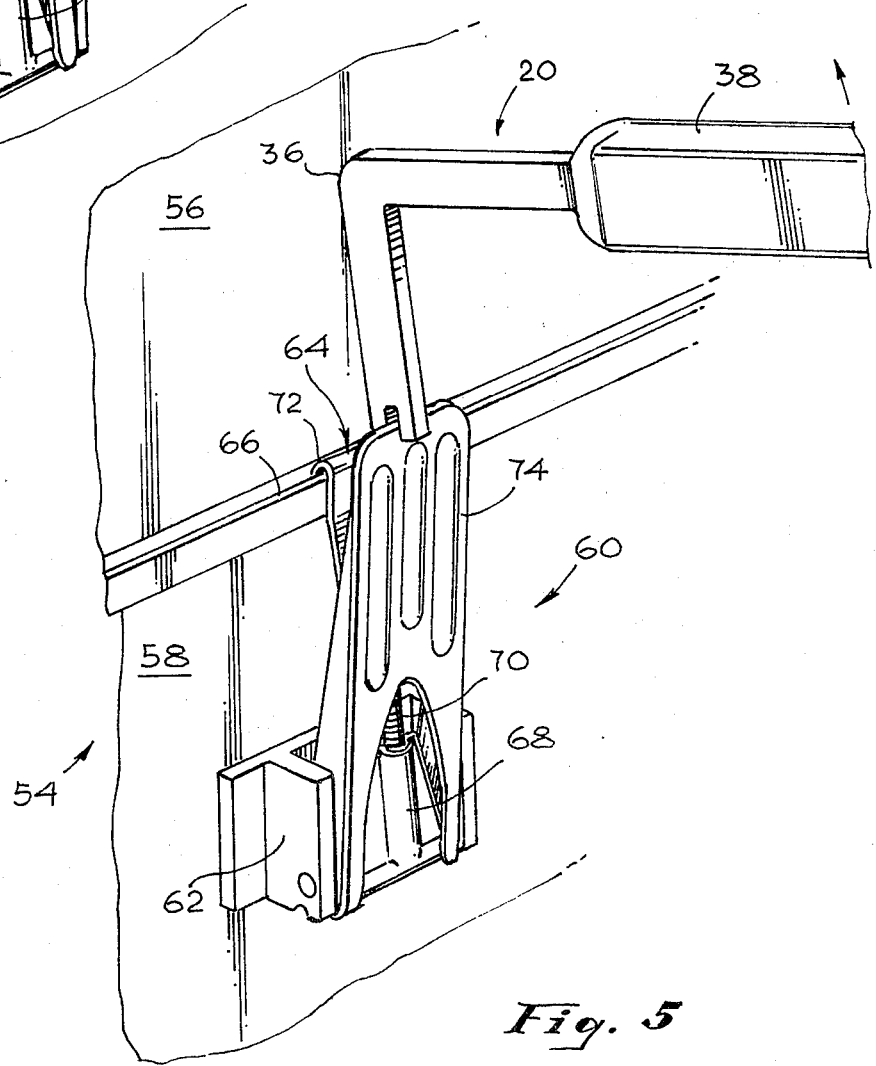
FIGS. 5 through 9 are sequential schematic perspective views of the tool of FIG. 1 in operation on the latch of FIG. 4 during opening of that latch, FIGS. 5 through 8 showing intermediate stages between the fully closed position of FIG. 4 and the fully open position of FIG. 9.
Figure 6:
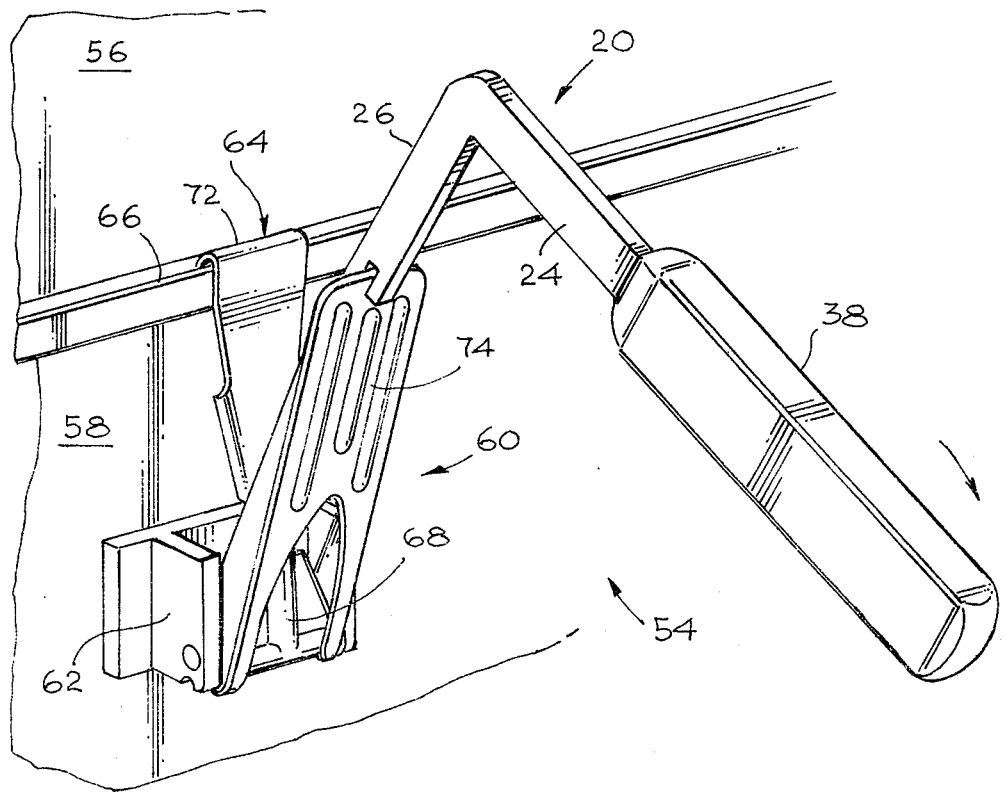
Figure 7:
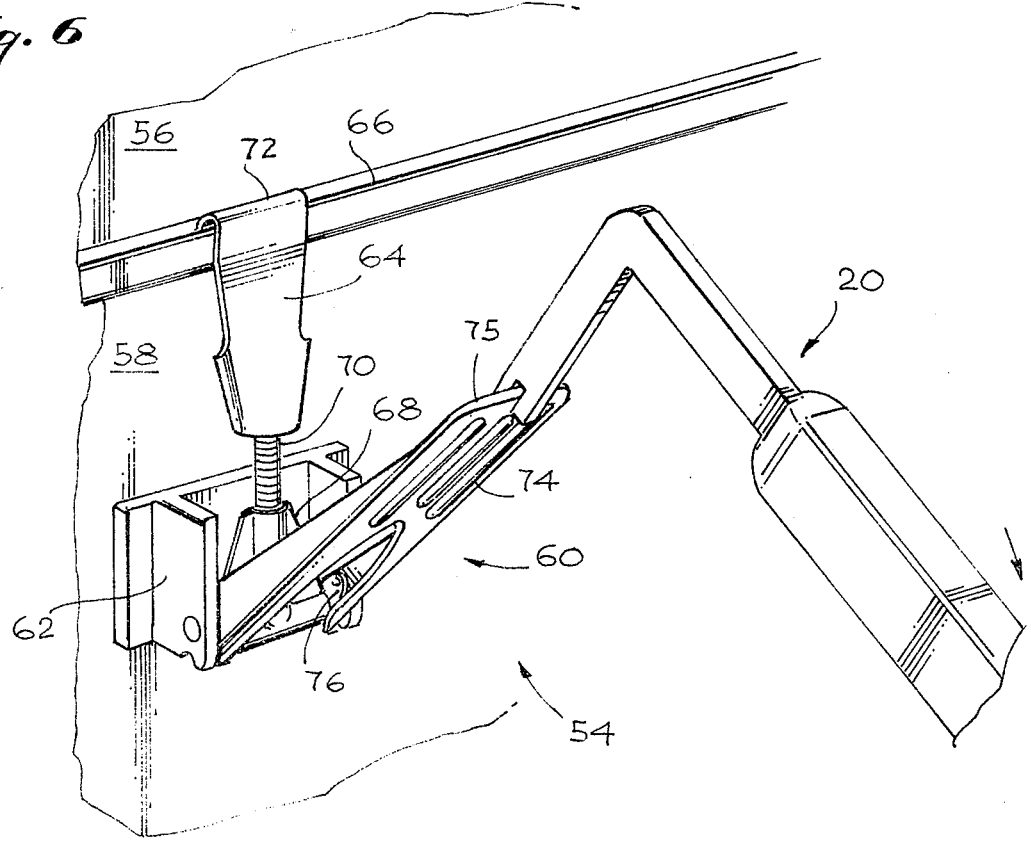
Figure 8:
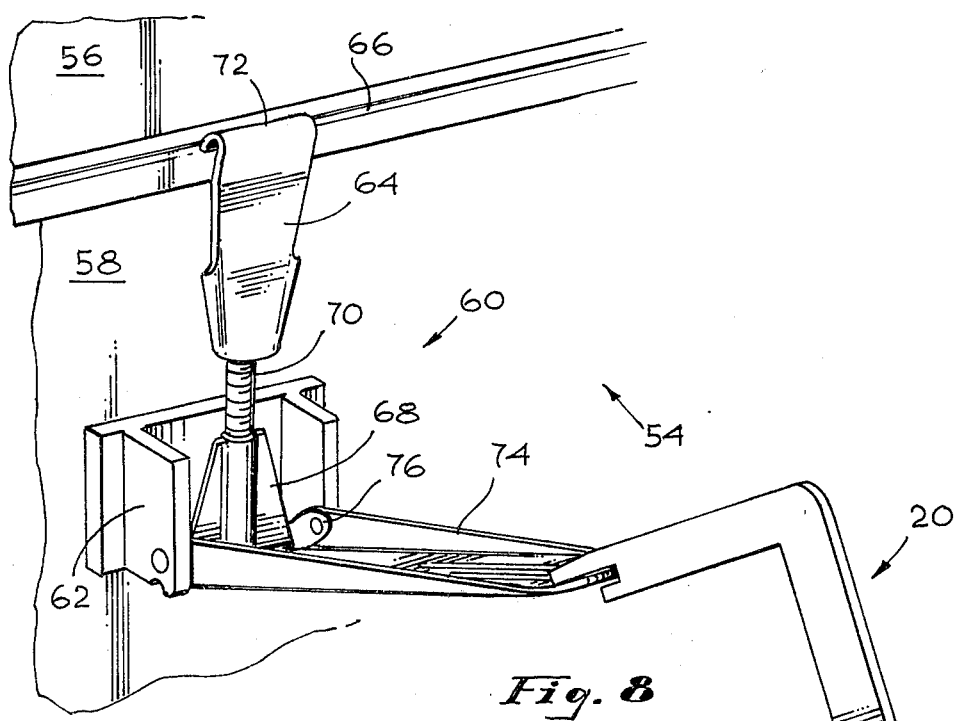

The desired rotation of tongue 74 from its closed upwardly extending vertical position (FIG. 4) to its inverted fully open position (FIG. 9) is easily accomplished through the use of tool 20. Thus, tool 20 is held so that leg 26 vertically depends from leg 24 and the upper edge 76 of tongue 74 is received within space 46, tine 42 being placed between tongue 74 and the adjoining face of container 54 (FIG. 4). Tool 20, while thus firmly engaging tongue 74 and with shoulder 36 against container 54, it first rotatable around the shoulder 36 so that handle 38 moves into the position shown in FIG. 5, thus forcing or prying tongue 74 away from container 54. Then tool 20 is pulled away from container 54 (FIGS. 6 and 7) and is rotated in the opposite direction from that described for FIG. 5, so that tongue 74 swings out from container 54 (FIG. 8) and down (FIG. 9) to the fully open position, releasing claw 64 from rim 66 and drawing it away from container 54.

Figure 9:
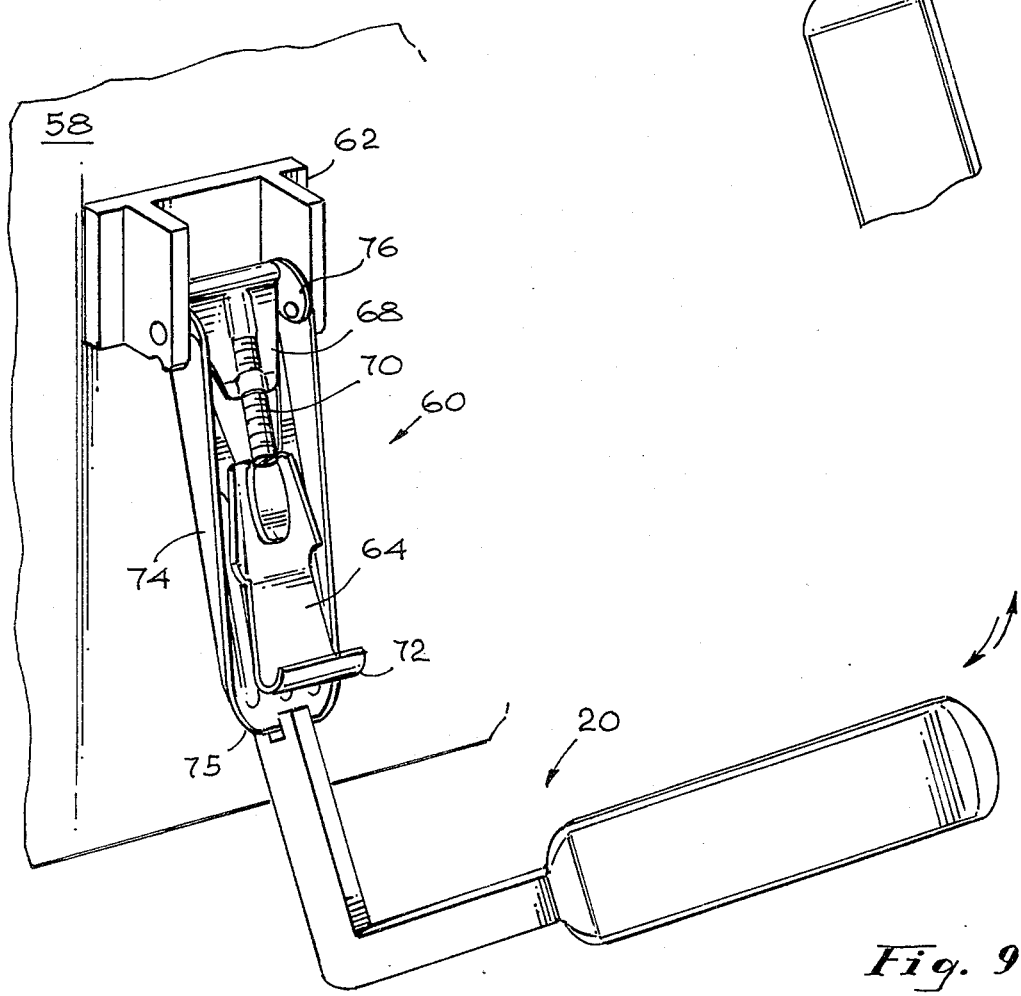
Figure 12:
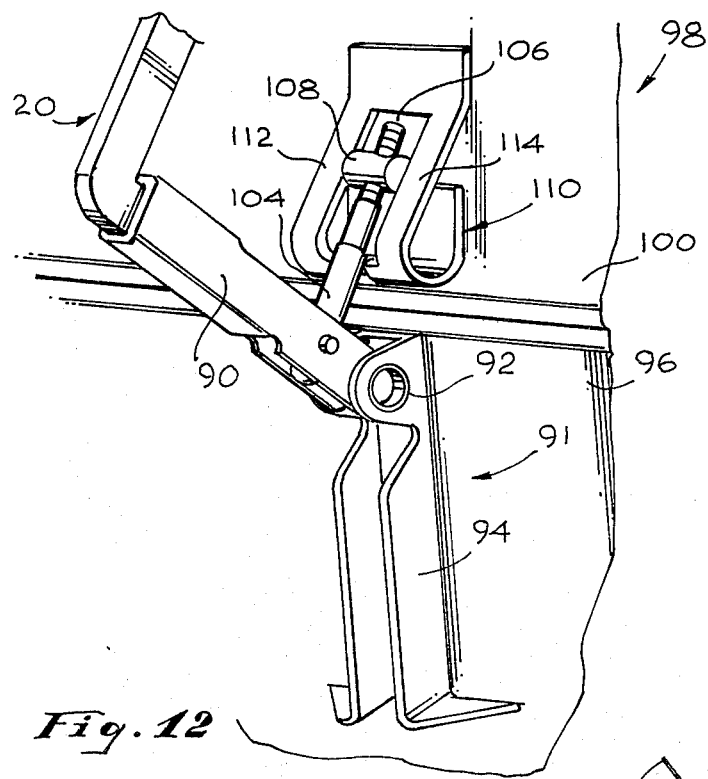

When it is desired to close container 54, the sequence described above is merely reversed, tool 20 first engaging tongue 74, as in FIG. 9, then being rotated to swing tongue 74 up (FIGS. 8, 7 and 6) to the fully closed position of FIG. 4. The operation shown in FIG. 5 may be eliminated.

Thus, tool 20 is simple, efficient and easy to use. It quickly opens and closes even large toggle latches of the tongue type which are very hard to manipulate by hand. Moreover, it easily engages and disengages such latches and maneuvers the tongues without danger or damage.

FIGS. 10–14

The use of tool 20 in the opening and closing of a container having a toggle latch of the hollow type is schematically depicted in FIGS. 10–14. Thus, tool 20 is shown in FIG. 10 inserted within a hollow open-bottom handle 90 of a latch 91. Handle 90 is pivotably secured at its upper end 92 to a bracket 94 affixed to the outside of the base 96 of a container 98 having a lid 100.

Figure 13:
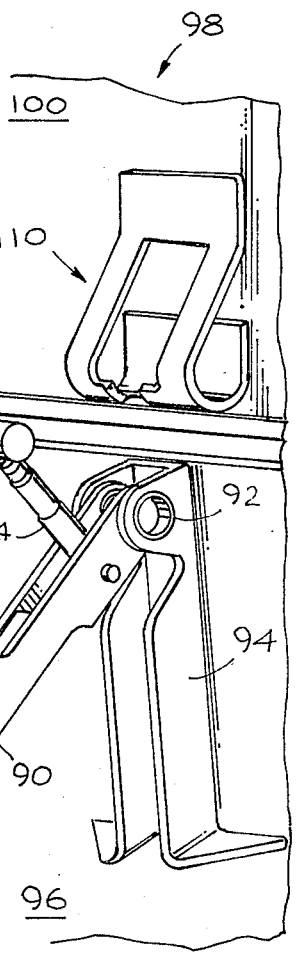
Figure 14:
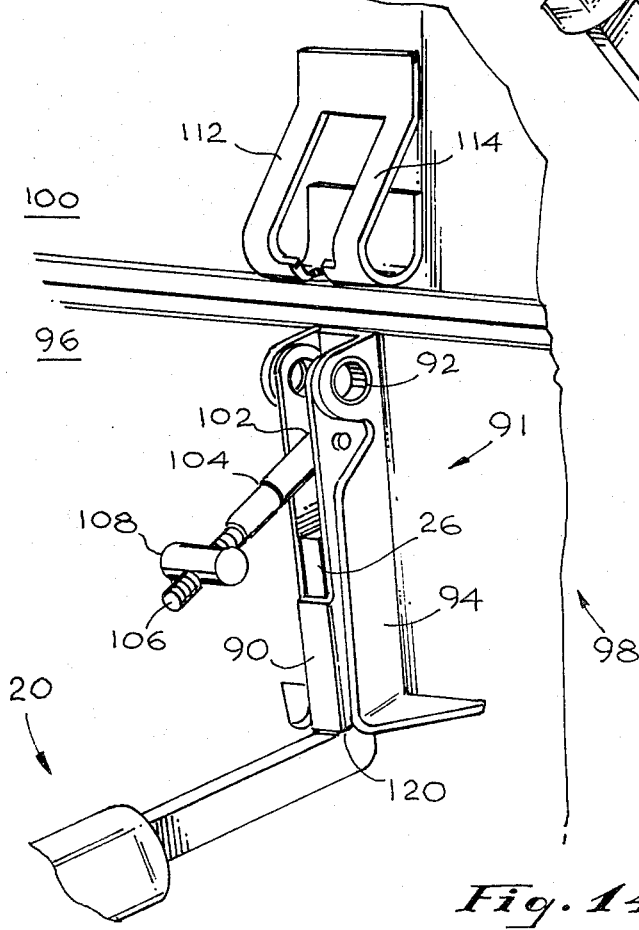

The lower end 102 of a rod 104 is disposed in handle 90 and is adjacent end 92 pivotably secured thereto. Rod 104 extends upwardly and outwardly from handle 90 and has a threaded upper end 106 bearing a transversely extending leg 108. The position of leg 108 relative to end 106 can be adjusted by rotation of leg 108 thereon when leg 108 is free of bracket 110, as shown in FIGS. 13 and 14. Bracket 110 is secured to lid 100 above bracket 94 and comprises a spaced pair of downwardly and outwardly extending arms 112 and 114 which are rearwardly curved at their lower ends 116 and 118, respectively, and are dimensioned to cradle leg 108 at ends 116 and 118, but are sufficiently spaced apart above ends 116 and 118 (FIG. 12) to permit leg 108 to pass therebetween (FIG. 12) and escape bracket 110. It will be understood that latch 91 includes brackets 94 and 110, handle 90, rod 104 and leg 108.

In the closed position shown in FIG. 10, handle 90 is vertical with its open end 120 facing down. In this position leg 108 is trapped by bracket 110 and is cradled by ends 116 and 118 so that lid 100 is held tightly against base 96. In order to open latch 91, tool 20 is inverted and leg 26 is inserted into end 120 (FIG. 10). Then tool 20 is rotated upwardly and outwardly from container 98 (FIG. 11), pivoting around leg 26 and causing handle 90 to similarly rotate around end 92 and force rod 104 and leg 108 upwardly. As this rotation continues (FIG. 12), leg 108 moves up and out of bracket 110, whereupon the rotation of tool 20 is reversed (FIGS. 13 and 14) to swing handle 90, rod 104 and leg 108 out, away and down from the area of lid 100 and into the fully open position of FIG. 14. Lid 100 can then be easily raised from base 96 and tool 20 can be disengaged from handle 90.

When it is desired to close (latch) container 98, the above-described procedure is reversed. Thus tool 20 is first inserted into handle 90 (FIG. 14). Tool 20 is then rotated upwardly around end 26 so that handle 90 is swung (rotated) around end 92 (FIGS. 13 and 12) until leg 108 passes between and behind arms 112 and 114, whereupon tool 20 is rotated in the opposite direction, that is, down to seat leg 108 in its fully cradled, locked position shown in FIG. 10, with end 120 of the handle in the vertical down position. Tool 20 is then removed from handle 90. Thus, tool 20 easily, rapidly and simply opens and closes latch 91 to lock and unlock container 98, without damage to latch 91 or container 98.

Tool 20 is also useful in the opening and closing of toggle latches of other types, in addition to those described above.

Although there have been described hereinabove specific arrangements of an improved toggle latch opening and closing tool in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. An improved toggle latch opening and closing tool, said tool comprising, in combination:

a generally L-shaped shank comprising first and second diverging legs generally prependicularly joined together at one end of each of said legs, said second leg being rectangular in cross section; and handle means attached to said first leg adjacent the free end of said leg, the free end of the second of said legs being extended along the shorter sides of said cross section and part of the longer sides of said cross section to form a bifurcation comprising spaced generally parallel inner and outer tines, the inner tine being relatively closer to said handle and shorter than the outer tine, adapted to releasably engage the edge of a toggle latch handle and to be slideably engaged in a toggle latch handle for opening and closing said latch.

2. The improved tool of claim 1 wherein said first leg extends forward of said handle means and wherein said second leg depends from the front end of said first leg.

3. The improved tool of claim 2 wherein the longer tine is tapered toward its tip to facilitate entry into operative position with an associated toggle latch.

4. The improved tool of claim 2 wherein said longer tine is at least about twice the length of said shorter tine and wherein the upper end of the space between said tines is generally rectangular for improved gripping of said latch handle by said tines and second end.

5. The improved tool of claim 4 wherein said handle means comprises a generally hand-fitting handle substantially larger in diameter than either of said legs and wherein said legs have vertical sides longer than the width of said legs.

6. The improved tool of claim 5 wherein the top margin of the juncture between said legs is rounded to facilitate prying with said tool.

* * * * *